June 10, 1958     F. R. HARRIS ET AL     2,838,275
GAS TURBINES
Filed Sept. 21, 1953     3 Sheets-Sheet 1

INVENTORS
Frank Roselyn Harris
John Arthur Doyle
By Harris & Bateman
ATTORNEYS

June 10, 1958  F. R. HARRIS ET AL  2,838,275
GAS TURBINES

Filed Sept. 21, 1953  3 Sheets-Sheet 2

INVENTORS
Frank Rosslyn Harris
John Arthur Bagle
By Maurice L. Bateman
ATTORNEYS

United States Patent Office 2,838,275
Patented June 10, 1958

2,838,275
GAS TURBINES

Frank Rosslyn Harris, Mumbles, Swansea, Wales, and John Arthur Boyle, Sale Moor, Sale, England, assignors to Metropolitan-Vickers Electrical Company Limited, London, England, a British company Application September 21, 1953, Serial No. 381,316

Claims priority, application Great Britain October 3, 1952

1 Claim. (Cl. 253—78)

This invention relates to diaphragms for gas turbines.

In gas turbines high and possibly uneven temperatures around the admission belt to the first stage nozzles make it desirable to ensure that individual nozzle blades are free to expand radially without giving rise to undue stress at any part. It is also desirable that the complete diaphragm should be free to expand or distort locally or as a whole in the axial and in the radial direction. Axial displacement of individual blades must not, however, be allowed. The diaphragm assembly, moreover, must be locked to prevent the torque reaction from causing circumferential displacement with respect to the cylinder of the turbine.

According to the present invention a diaphragm assembly comprises a hub-member, such as a diaphragm centre ring, an annular row of nozzle blades which are attached to the hub-member and which project radially therefrom, and an outer ring which is provided with a series of recesses with each of which the radially outer end of a respective blade interfits for movement of said blade in the radial direction only, said outer ring being also provided with a series of outwardly-extending radial projections or other abutments each of which can slide radially and axially in a respective groove or other recess in the inner wall of the turbine cylinder to permit the ring to expand, distort or otherwise move radially and axially but to prevent circumferential movement of the ring with respect to the cylinder.

One advantage of such a diaphragm assembly is that it enables the manufacture of the blade to be simplified in that whereas in prior blades the radially outer end is considerably wider circumferentially than the inner end, and the blades must consequently be manufactured from blading bar blank at least as wide as the radially outer end, with the construction according to this invention, it is possible to use blading bar blank not greater in width than the circumferential width of the inner end.

One embodiment of the invention will now be described by way of example, with reference to the accompanying drawings, in which.

Figure 1:
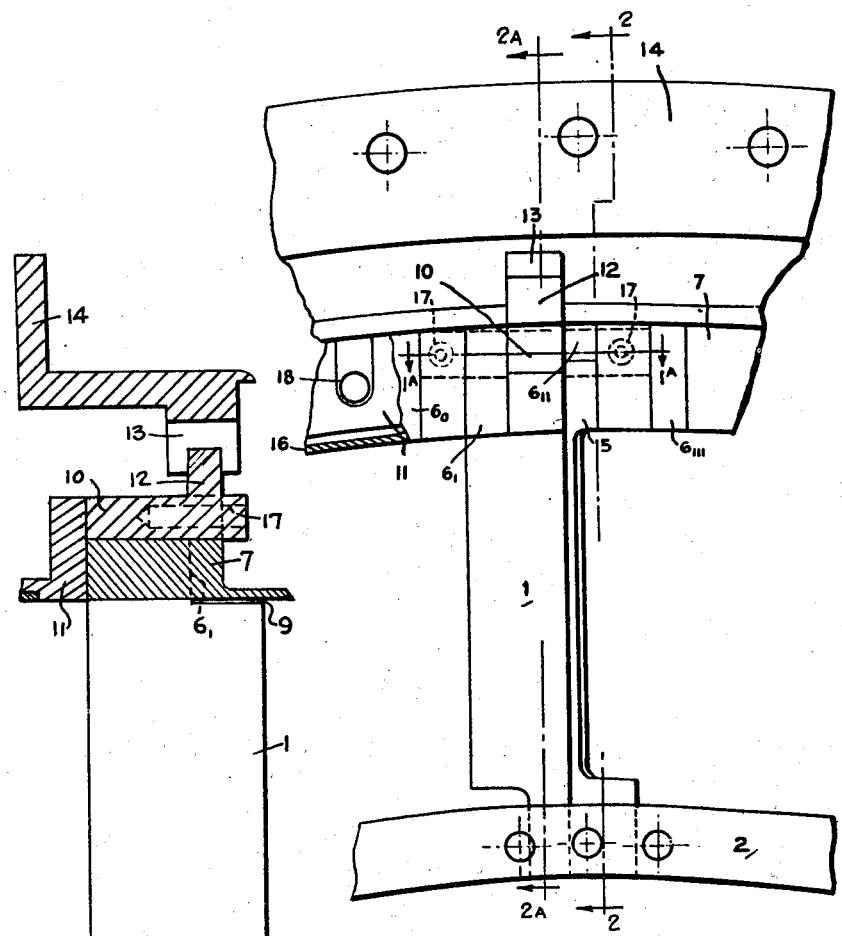
Fig. 1 is a fragmentary elevation of a diaphragm assembly.
Figure 2A:
Fig. 2A is a section on the line 2A—2A in Fig. 1.
Figure 4:
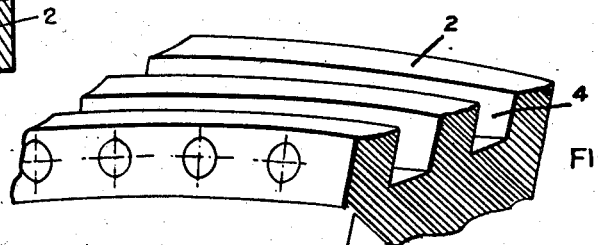
Fig. 4 is a fragmentary perspective view in section of a diaphragm centre ring.
Figure 1A:
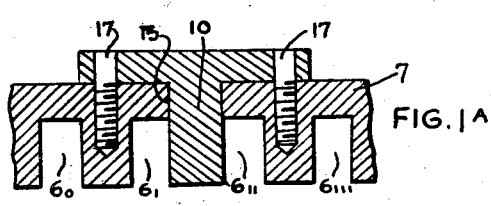
Fig. 1A is a detail section on the line 1A—1A in Fig. 1.
Figure 9:
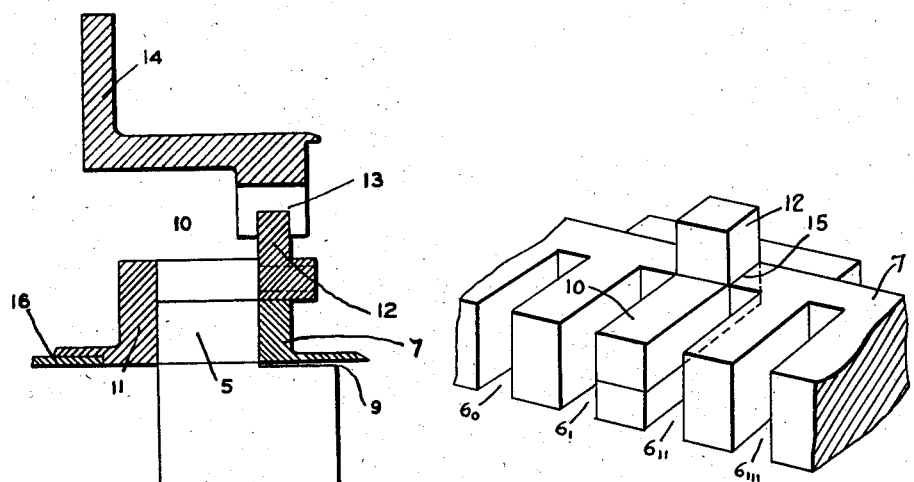
Fig. 9 is a perspective view showing the key of Fig. 7 in position in the outer diaphragm ring of Fig. 5.
Figure 2:
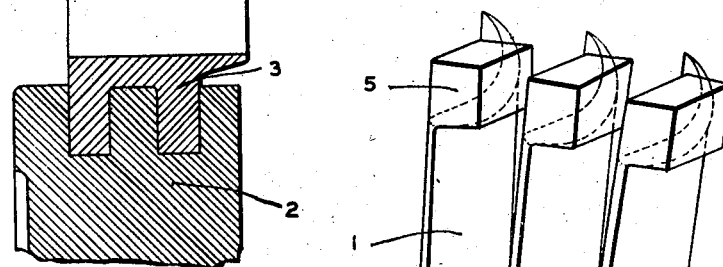
Fig. 2 is a fragmentary sectional end elevation of the assembly on the line 2—2 in Fig. 1.
Figure 3:
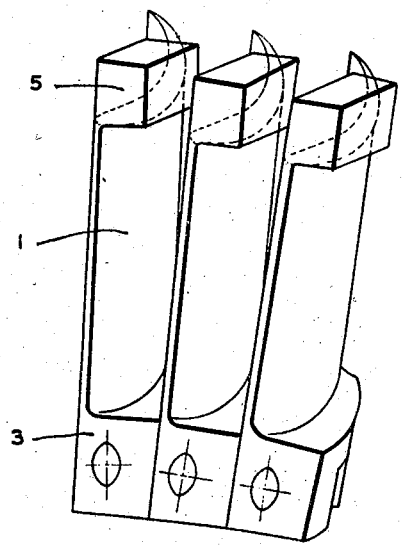
Fig. 3 is a perspective view of nozzle blading for inclusion in the diaphragm of Figs. 1 and 2.
Figure 5:
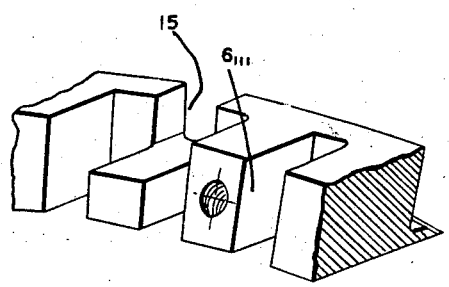
Fig. 5 is a fragmentary perspective view in section of an outer diaphragm ring.
Figure 6:
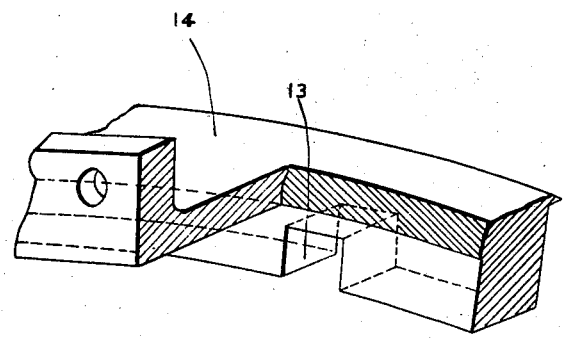
Fig. 6 is a fragmentary perspective view in section of a cylinder modified in accordance with the invention.
Figure 7:
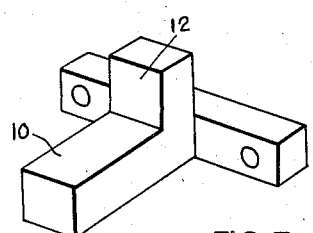
Fig. 7 is a perspective view of a key for connecting the ring in Fig. 5 with the cylinder in Fig. 6.
Figure 8:
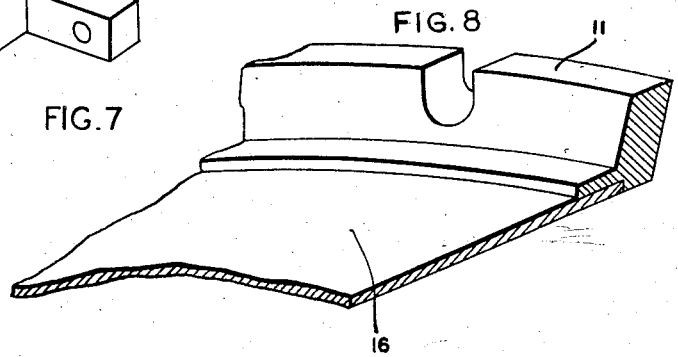
Fig. 8 is a fragmentary perspective view in section of a flange for closing the recesses in the outer ring.

In the diaphragm assembly shown, a row of nozzle blades 1 is attached to a diaphragm hub member 2 by roots 3 of the blades, which roots are bolted in place in annular grooves 4 in the hub member 2. The blades 1 are formed at their radially outer ends with rectangular blocks 5 which interfit with correspondingly shaped recesses $6_0$, $6_1$, $6_{11}$, $6_{111}$, etc., in an outer ring 7 with sufficient clearance to enable each blade to expand radially. The rectangular blocks 5 must be of sufficient length so that they enter said recesses when the diaphragm is cold, i. e., not working, to a point above the bottom of the key 10, but need not completely fill the recesses. The extent of this radial expansion is limited by the blade taking up a clearance space 9 between the portion of the blade and the inner annular surface of the ring (Fig. 2). Bolted axially on the ring 7 is an annular flange 11 which closes the ends of the recesses 6 and prevents axial displacement of the blades individually. The flange 11 may be attached to the ring 7 in any suitable manner such as by bolting, riveting, or welding. Said flange 11 is connected to the outer wall 16 of a combustion chamber of the turbine.

Further recesses 15 are provided in the ring 7 which interfit with keys 10 which are bolted in place in the recesses 15 through holes 17. The keys 10 are provided with radially extending rectangular projections 12 which can slide axially and radially in corresponding axial grooves or recesses 13 in the turbine cylinder 14. This prevents torque reaction causing circumferential displacement of the diaphragm assembly.

The diaphragm assembly described above enables each blade individually to expand radially by a limited amount, but prevents it from moving axially relative to the diaphragm. The diaphragm assembly is able to move locally or as a whole both radially and axially by virtue of the radial projections 12 of the keys 10 being able to slide in the grooves or recesses 13.

Ten keys 10 are provided according to the embodiment described above, these keys being equally spaced around the circumference of the ring 7. The number of keys will, however, normally depend upon the number of blades in the diaphragm.

What we claim is:

In a gas turbine cylinder, a diaphragm assembly comprising a hub member, an annular row of nozzle blades attached to said hub member, an outer annular ring concentric with said hub member and attached to the outer ends of said blades in a manner which permits radial expansion of the blades relative to said outer ring, an inner wall to said turbine cylinder, surfaces defining axial grooves in said inner wall, surfaces defining recesses extending axially and radially outwards in said outer ring, and a plurality of radially extending keys connecting the outer ring and the inner wall of the turbine cylinder, each of said keys having an axial projection thereon engaging a corresponding recess in said outer ring and a radial projection engaging a corresponding axial groove in said turbine wall and slidable therein to permit said outer ring to expand radially and axially but to prevent circumferential movement of the outer ring with respect to said inner wall, said keys having arms thereon extending circumferentially and bolted to said outer ring to prevent relative movement between the keys and the outer ring.

References Cited in the file of this patent

UNITED STATES PATENTS

| | | |
|---|---|---|
| 2,447,942 | Imbert et al. | Aug. 24, 1948 |
| 2,628,067 | Lombard | Feb. 10, 1953 |
| 2,654,566 | Boyd et al. | Oct. 6, 1953 |